US010367643B2

United States Patent
Sokolov et al.

(10) Patent No.: US 10,367,643 B2
(45) Date of Patent: Jul. 30, 2019

(54) SYSTEMS AND METHODS FOR MANAGING ENCRYPTION KEYS FOR SINGLE-SIGN-ON APPLICATIONS

(71) Applicant: Symantec Corporation, Mountain View, CA (US)

(72) Inventors: Ilya Sokolov, Boston, MA (US); Keith Newstadt, West Newton, MA (US)

(73) Assignee: Symantec Corporation, Mountain View, CA (US)

( * ) Notice: Subject to any disclaimer, the term of this patent is extended or adjusted under 35 U.S.C. 154(b) by 335 days.

(21) Appl. No.: 15/083,032

(22) Filed: Mar. 28, 2016

(65) Prior Publication Data

US 2017/0279613 A1 Sep. 28, 2017

(51) Int. Cl.
*G06F 21/00* (2013.01)
*H04L 29/06* (2006.01)
(Continued)

(52) U.S. Cl.
CPC .......... *H04L 9/3228* (2013.01); *H04L 9/0822* (2013.01); *H04L 9/14* (2013.01); *H04L 63/06* (2013.01); *H04L 63/0815* (2013.01)

(58) Field of Classification Search
CPC ..... H04L 9/3228; H04L 63/0815; H04L 9/14; H04L 63/06; H04L 9/0822
See application file for complete search history.

(56) References Cited

U.S. PATENT DOCUMENTS

| 9,529,733 | B1 | 12/2016 | Sokolov et al. |
| 2005/0172127 | A1 | 8/2005 | Hartung et al. |

(Continued)

FOREIGN PATENT DOCUMENTS

| EP | 2204754 A1 * | 7/2010 | ............ G06F 21/335 |
| EP | 2784717 | 10/2014 | |

OTHER PUBLICATIONS

Jyun-Yao Huang ; I-En Liao ; Cheng-Kang Chiang; "Efficient Identity-Based Key Management for Configurable Hierarchical Cloud Computing Environment"; 2011 IEEE 17th International Conference on Parallel and Distributed Systems; Year Nov. 2011, pp. 883-887 (Year: 2011).*

(Continued)

*Primary Examiner* — Kendall Dolly
*Assistant Examiner* — Courtney D Fields
(74) *Attorney, Agent, or Firm* — FisherBroyles, LLP

(57) ABSTRACT

The disclosed computer-implemented method for managing encryption keys for single-sign-on applications may include (1) receiving, from an identity service, notification of a request to access encrypted data on a cloud service, the notification including a session key for encrypting and decrypting a master key for decrypting cloud service keys, (2) deriving the master key, (3) decrypting, using the master key, a cloud service key for decrypting data on the cloud service, (4) storing the master key, encrypted using the session key, (5) receiving an additional notification of an additional request to access encrypted data on an additional cloud service, the notification including the session key, (6) without again obtaining the authentication element from the user, decrypting the master key, and (7) decrypting, using the master key, an additional cloud service key for decrypting data on the additional cloud service. Various other methods, systems, and computer-readable media are also disclosed.

19 Claims, 6 Drawing Sheets

(51) Int. Cl.
*H04L 9/32* (2006.01)
*H04L 9/08* (2006.01)
*H04L 9/14* (2006.01)
*G06F 21/62* (2013.01)

(56) References Cited

U.S. PATENT DOCUMENTS

| | | | |
|---|---|---|---|
| 2010/0212022 A1 | 8/2010 | Greevenbosch et al. | |
| 2012/0328105 A1 | 12/2012 | Mukkara et al. | |
| 2013/0173477 A1* | 7/2013 | Cairns | G06Q 20/3226 705/76 |
| 2014/0237250 A1 | 8/2014 | Menezes et al. | |
| 2017/0289135 A1* | 10/2017 | Uchil | G06F 21/41 |

OTHER PUBLICATIONS

Ilya Sokolov, et al.; Systems and Methods for Securely Accessing Encrypted Data Stores; U.S. Appl. No. 14/490,026; filed Sep. 18, 2014.

"Norton Zone", http://en.wikipedia.org/wiki/Norton_Zone, as accessed Jul. 23, 2014, Wikipedia, (On or before Jul. 23, 2014).

"Norton Identity Safe", https://identitysafe.norton.com/, as accessed Jul. 23, 2014, Symantec Corporation, (1995).

"Symantec Endpoint Encryption", http://www.symantec.com/endpoint-encryption/, as accessed Jul. 23, 2014, Symantec Corporation, (1995).

"KeyNexus", https://keynexus.net/product/how-it-works/, as accessed Mar. 2, 2016, (Jul. 7, 2014).

Campagna, Matthew, "AWS Key Management Service Cryptographic Details", https://d0.awsstatic.com/whitepapers/KMS-Cryptographic-Details.pdf, as accessed Mar. 2, 2016, Amazon Web Services, (May 2015).

Bradley, John, "Bringing Single Sign-On to Mobile Applications", https://www.pingidentity.com/en/blog/2015/07/01/bringing_single_sign-on_to_mobile_applications.html, as accessed Mar. 2, 2016, (Jul. 1, 2015).

Bradley, John, "Bringing Single Sign on to Mobile Applications", https://www.cloudidentitysummit.com/bringing-single-sign-on-to-mobile-applications/, (presentation at https://www.youtube.com/watch?v=T0DRLYBXuHE, as accessed Mar. 2, 2016), Cloud Identity Summit (CIS) 2015, (Jun. 9, 2015).

"FIPS PUB 140-2", http://csrc.nist.gov/groups/STM/cmvp/standards.html, as accessed Mar. 2, 2016, Standards, FIPS PUB 140-2—Effective Nov. 15, 2001, Security Requirements for Cryptographic Modules, (Nov. 4, 2007).

"Keystore", https://en.wikipedia.org/wiki/Keystore, as accessed Mar. 2, 2016, Wikipedia, (Jul. 10, 2011).

"Hardware security module", https://en.wikipedia.org/wiki/Hardware_security_module, as accessed Mar. 2, 2016, Wikipedia, (Sep. 13, 2006).

"Dropbox", https://www.dropbox.com/, as accessed Mar. 2, 2016, (Dec. 26, 1996).

"LastPass", https://lastpass.com/, as accessed Mar. 2, 2016, (Apr. 14, 2003).

Mahemoff, Michael, "Client-Side Storage", http://www.html5rocks.com/en/tutorials/offline/storage/, as accessed Mar. 2, 2016, (Oct. 1, 2010).

"Amazon", https://www.amazon.com/, as accessed Mar. 2, 2016, (Dec. 12, 1998).

"What is KeyNexus?", https://keynexus.net/, as accessed Mar. 2, 2016, (Oct. 18, 2013).

* cited by examiner

SYSTEMS AND METHODS FOR MANAGING ENCRYPTION KEYS FOR SINGLE-SIGN-ON APPLICATIONS

BACKGROUND

Increasingly, individuals and organizations are using cloud-based systems for data storage, even for sensitive data. For the most part, cloud data storage systems are operated by large corporations with good reputations that rely on best practices to ensure the security of their clients' data. Unfortunately, as demonstrated by some widely-reported leaks of sensitive data stored in cloud services, even the best practices may not adequately protect sensitive data.

Data stored in cloud services is often vulnerable at a number of points. Access to the user's cloud service account may be accessible to anyone who can obtain or guess the username and password for the account. Data may be transmitted unencrypted or with only weak encryption in either direction between the user and cloud service. System administrators or data backup services employed by the cloud service may be able to access and transmit user data to unauthorized recipients. And, while the cloud service may store user data in encrypted form, the cryptographic key needed to decrypt the data may be still accessible to system administrators of the cloud service.

Since most security practices used by cloud services typically remain confidential, users may have only the reputation of the cloud service to assure them that proper security measures have been implemented. Some large organizations try to ensure that their sensitive data is being adequately protected by operating their own cloud storage service. Even so, these organizations still rely on the competence and integrity of the system administrators they employ to ensure that data security policies are properly implemented.

Even when users protect their account with strong passwords kept inaccessible to others, their data is securely encrypted as it is transmitted to and from the cloud service, and the cloud service has implemented best data security practices, the cloud service may still be obligated to release sensitive data when legally required by government. Implementing these measures may also be inconvenient for users, requiring them to provide authentication credentials each time they accesses cloud-based applications. Accordingly, the instant disclosure identifies and addresses a need for additional and improved systems and methods for managing encryption keys for single-sign-on applications.

SUMMARY

As will be described in greater detail below, the instant disclosure describes various systems and methods for managing encryption keys for single-sign-on applications. The disclosed systems and methods maintain keys for decrypting data in cloud services by encrypting the keys using a master key and storing the keys in encrypted form. The disclosed systems and methods facilitate storage of encryption keys in various locations, depending on the needs of the cloud service and the desired level of data security. In situations where a high level of data security is desirable, the disclosed systems and methods may not permit cloud services access either to unencrypted data or to keys for decrypting user data.

In one example, a computer-implemented method for managing encryption keys for single-sign-on applications may include (1) receiving, from an identity service, a notification of a request to access encrypted data on a cloud service, the notification including a session key for encrypting and decrypting a master key for decrypting cloud service keys, (2) deriving, based on at least one authentication element received from a user, the master key, (3) decrypting, using the master key, a cloud service key for decrypting data on the cloud service, (4) storing the master key, encrypted using the session key, in a client key store, (5) receiving, from the identity service, an additional notification of an additional request to access encrypted data on an additional cloud service, the notification including the session key, (6) without again obtaining the authentication element from the user, decrypting the master key by using the session key, and (7) decrypting, using the master key, an additional cloud service key for decrypting data on the additional cloud service.

In some examples, deriving the master key may include applying a hashing function to the authentication element received from the user. In some examples, deriving the master key may include (1) authenticating the user based on the authentication element received from the user, (2) in response to authenticating the user, retrieving a private key for encrypting and decrypting the master key, and (3) using the private key to decrypt the master key.

In some examples, the computer-implemented method may further include providing the decrypted cloud service key to the cloud service for decrypting the encrypted data. In one embodiment, the computer-implemented method may further include receiving, on the client, the encrypted data from the cloud service for decryption using the decrypted cloud service key. In some examples, the computer-implemented method may further include receiving the encrypted cloud service key from the cloud service. In some examples, the computer-implemented method may further include receiving the encrypted cloud service key from the identity service.

In some examples, receiving the encrypted cloud service key may include receiving the cloud service key with the session key and/or receiving the cloud service key in response to a request to the identity service to provide the cloud service key. In one embodiment, the computer-implemented method may further include receiving, at the identity service, a request to facilitate access to encrypted data on the cloud service by providing to a client agent the session key for encrypting and decrypting the master key for decrypting cloud service keys and providing the session key to the client agent.

In one embodiment, a system for implementing the above-described method may include several modules stored in memory, such as (1) a session module that receives, from an identity service, a notification of a request to access encrypted data on a cloud service, the notification including a session key for encrypting and decrypt a master key for decrypting cloud service keys, and receives, from the identity service, an additional notification of an additional request to access encrypted data on an additional cloud service, the notification including the session key, (2) a derivation module that derives, based on at least one authentication element received from a user, the master key, (3) a service module that decrypts, using the master key, a cloud service key for decrypting data on the cloud service, and decrypts, using the master key, an additional cloud service key for decrypting data on the additional cloud service, (4) an encryption module that stores the master key, encrypted using the session key, in a client key store, and/or (5) a decryption module that, without again obtaining the authentication element from the user, decrypts the master key using the session key. The system may also include at least one physical processor configured to execute the session module, the derivation module, the service module, the encryption module, and the decryption module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) receive, from an identity service, a notification of a request to access encrypted data on a cloud service, the notification including a session key for encrypting and decrypting a master key for decrypting cloud service keys, (2) derive, based on at least one authentication element received from a user, the master key, (3) decrypt, using the master key, a cloud service key for decrypting data on the cloud service, (4) store the master key, encrypted using the session key, in a client key store, (5) receive, from the identity service, an additional notification of an additional request to access encrypted data on an additional cloud service, the notification including the session key, (6) without again obtaining the authentication element from the user, decrypt the master key by using the session key, and (7) decrypt, using the master key, an additional cloud service key for decrypting data on the additional cloud service.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
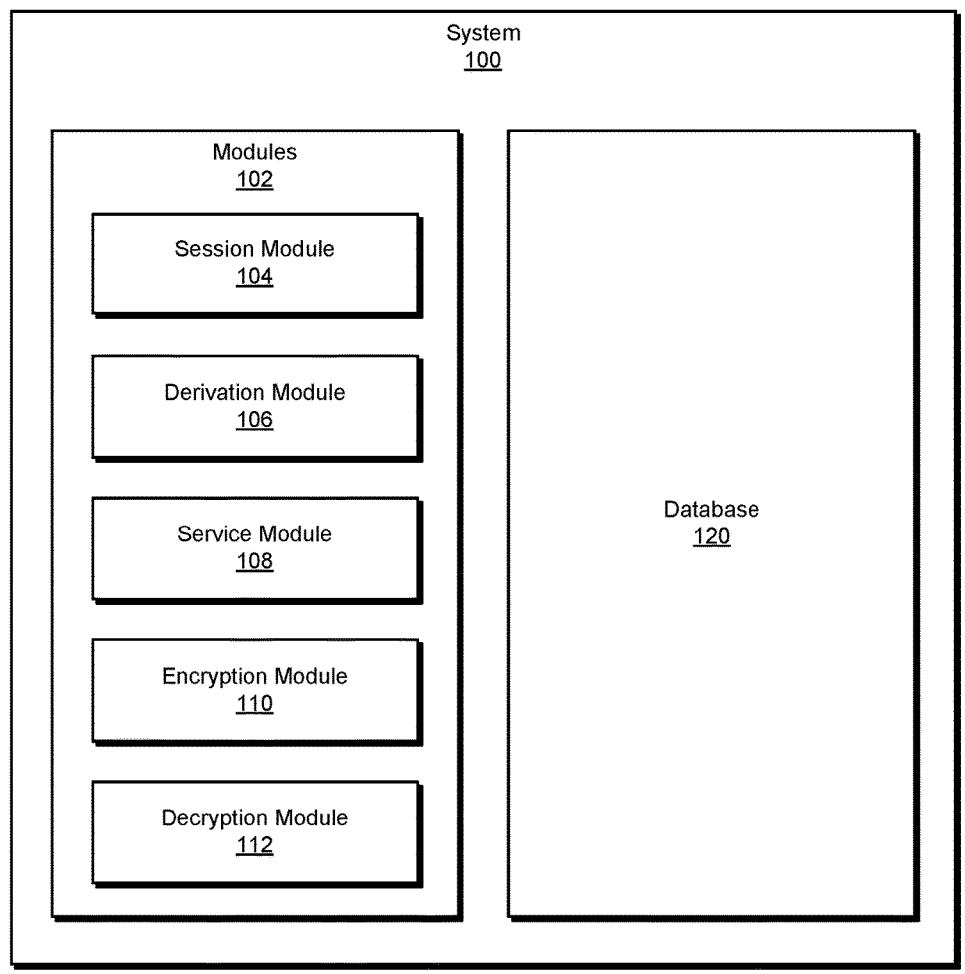
FIG. 1 is a block diagram of an exemplary system for managing encryption keys for single-sign-on applications.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for managing encryption keys for single-sign-on applications. As will be explained in greater detail below, the systems and methods described herein may manage encryption keys to facilitate single-sign-on without compromising security of encrypted data. The systems and methods described herein may provide user access to encrypted data residing at multiple cloud services without reauthentication and without the need to store encryption keys with the encrypted data. In some embodiments of the disclosed systems, cloud services never access keys needed to decrypt data stores, and data at each encrypted data store may be encrypted using a unique encryption key. In some embodiments, the disclosed systems and methods may facilitate single-sign-on from multiple devices. In addition to providing single-sign-on to cloud applications, the disclosed systems and methods may also be applied to client applications.

Figure 2:
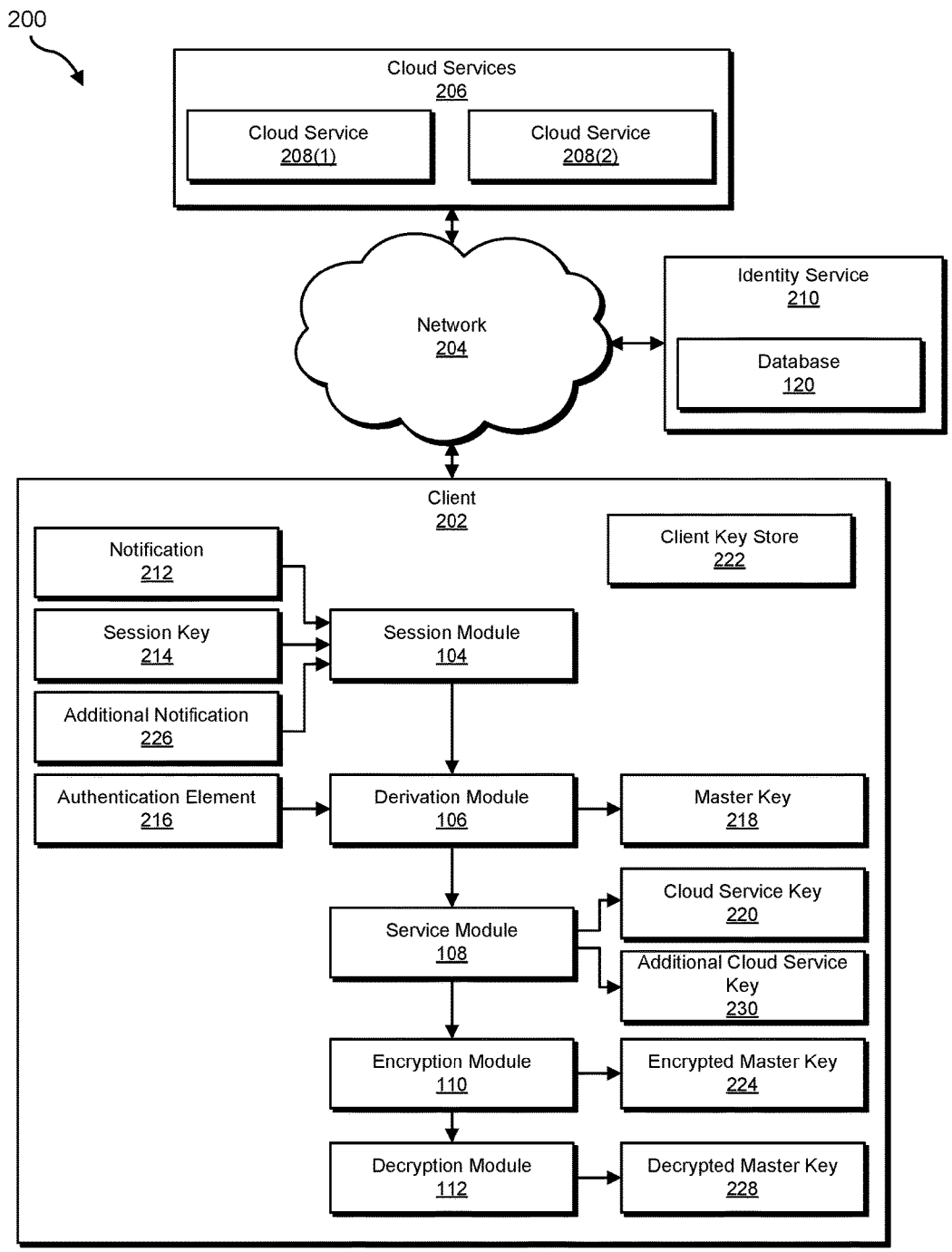
FIG. 2 is a block diagram of an additional exemplary system for managing encryption keys for single-sign-on applications.
Figure 3:
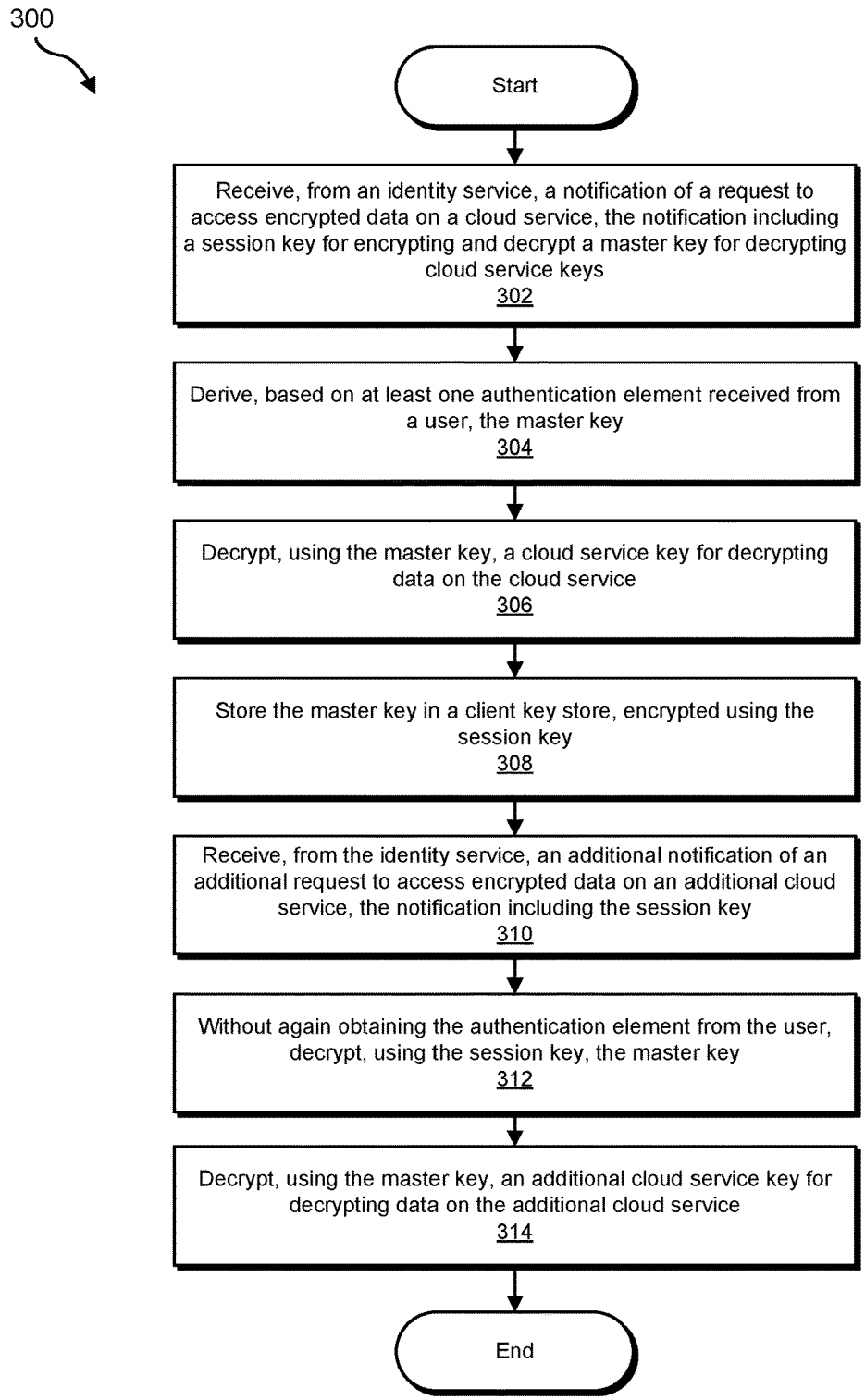
FIG. 3 is a flow diagram of an exemplary method for managing encryption keys for single-sign-on applications.
Figure 4:
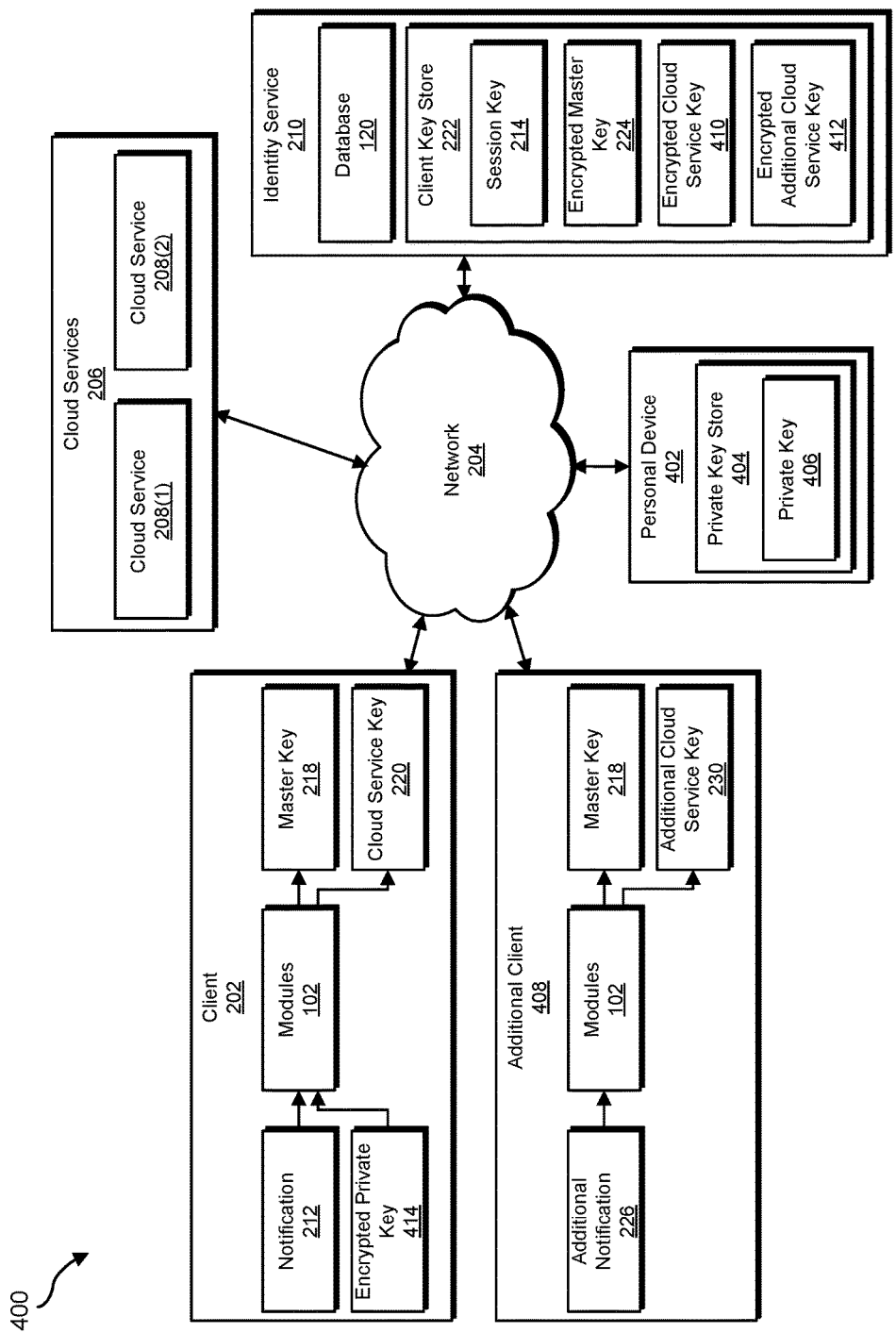
FIG. 4 is a block diagram of an additional exemplary system for managing encryption keys for single-sign-on applications.

The following will provide, with reference to FIGS. 1, 2, and 4, detailed descriptions of exemplary systems for managing encryption keys for single-sign-on applications. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of exemplary system 100 for managing encryption keys for single-sign-on applications. As illustrated in this figure, exemplary system 100 may include one or more modules 102 for performing one or more tasks. For example, and as will be explained in greater detail below, exemplary system 100 may include a session module 104 that receives, from an identity service, a notification of a request to access encrypted data on a cloud service, the notification including a session key for encrypting and decrypt a master key for decrypting cloud service keys. Exemplary system 100 may additionally include a derivation module 106 that derives, based on at least one authentication element received from a user, the master key. Exemplary system 100 may also include a service module 108 that decrypts, using the master key, a cloud service key for decrypting data on the cloud service. Exemplary system 100 may additionally include an encryption module 110 that stores the master key, encrypted using the session key, in a client key store. Session module 104 may further receive, from the identity service, an additional notification of an additional request to access encrypted data on an additional cloud service, the notification including the session key. Exemplary system 100 may also include a decryption module 112 that, without again obtaining the authentication element from the user, decrypts the master key using the session key. Service module 108 may further decrypt, using the master key, an additional cloud service key for decrypting data on the additional cloud service. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks.

For example, and as will be described in greater detail below, one or more of modules 102 may represent software modules stored and configured to run on one or more computing devices, such as the devices illustrated in FIG. 2 (e.g., client 202 and/or cloud services 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store user account data, cloud service information, and/or cryptographic keys. Database 120 may represent portions of a single database or computing device or a plurality of databases or computing devices. For example, database 120 may represent a portion of cloud services 206 or identity service 210 in FIG. 2, computing system 510 in FIG. 5, and/or portions of exemplary network architecture 600 in FIG. 6. Alternatively, database 120 in FIG. 1 may represent one or more physically separate devices capable of being accessed by a computing device, such as cloud services 206 or identity service 210 in FIG. 2, computing system 510 in FIG. 5, and/or portions of exemplary network architecture 600 in FIG. 6.

Exemplary system 100 in FIG. 1 may be implemented in a variety of ways. For example, all or a portion of exemplary system 100 may represent portions of exemplary system 200 in FIG. 2. As shown in FIG. 2, system 200 may include a client 202 in communication with cloud services 206 and identity service 210 via a network 204. In one example, client 202 may be programmed with one or more of modules 102 and/or may store all or a portion of the data in database 120. Additionally or alternatively, cloud services 206 or identity service 210 may be programmed with one or more of modules 102 and/or may store all or a portion of the data in database 120.

In one embodiment, one or more of modules 102 from FIG. 1 may, when executed by at least one processor of client 202, cloud services 206, and/or identity service 210, enable client 202, cloud services 206, and/or identity service 210 to managing encryption keys for single-sign-on applications. For example, and as will be described in greater detail below, one or more of modules 102 may cause client 202, cloud services 206, and/or identity service 210 to managing encryption keys for single-sign-on applications. For example, and as will be described in greater detail below, session module 104 may receive, from identity service 210, a notification 212 of a request to access encrypted data on cloud service 208(1), notification 212 including a session key 214 for encrypting and decrypting a master key 218 for decrypting cloud service keys. Derivation module 106 may derive, based on at least one authentication element 216 received from a user, master key 218. Service module 108 may decrypt, using master key 218, a cloud service key 220 for decrypting data on cloud service 208(1).

In some examples, encryption module 110 may encrypt store master key 218 using session key 214 to produce encrypted master key 224, and store encrypted master key 224 in client key store 222. Session module 104 may receive, from identity service 210, an additional notification 226 of an additional request to access encrypted data on additional cloud service 208(2), notification 212 including session key 214. Decryption module 112 may, without again obtaining authentication element 216 from the user, decrypt master key 218 using session key 214. Service module 108 may decrypt, using master key 218, additional cloud service key 230 for decrypting data on additional cloud service 208(2).

Client 202 generally represents any type or form of computing device capable of reading computer-executable instructions. Examples of client 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 510 in FIG. 5, or any other suitable computing device.

Cloud services 206 and identity service 210 generally represent any type or form of computing device that is capable of communicating, comparing, and/or storing data. Examples of cloud services 206 and identity service 210 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between client 202, cloud services 206, and identity service 210.

FIG. 3 is a flow diagram of an exemplary computer-implemented method 300 for managing encryption keys for single-sign-on applications. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302, one or more of the systems described herein may receive, from an identity service, a notification of a request to access encrypted data on a cloud service, the notification including a session key for encrypting and decrypt a master key for decrypting cloud service keys. For example, session module 104 may, as part of client 202 in FIG. 2, receive, from identity service 210, notification 212 of a request to access encrypted data on cloud service 208(1). Notification 212 may include session key 214 for encrypting and decrypt master key 218, which subsequently may be used to decrypt cloud service keys.

The term "identity service," as used herein, generally refers to a network service that verifies personal identities, based on authentication credentials provided by a user. An identity service may operate as an independent service provider that provides identity verification services under contract with other network service providers, within a private organization, or as part of a cloud service.

In one embodiment, identity service 210 may receive a request to facilitate access to encrypted data on cloud service 208(1). In response to the request, identity service 210 may provide a session key 214 to session module 104 on client 202. As will be described in greater detail below, systems described herein may use session key 214 to decrypt master key 218, which subsequently may be used to decrypt cloud service keys.

Session module 104 may receive notification of a request to access encrypted data on a cloud service in a variety of ways. For example, session module 104 may, executing as part of a client agent on client 202, receive notification 212 from identity service 210 that identity service 210 has received a request from cloud service 208(1) to verify the identity of the user on client 202, so that client 202 may access data stored on cloud service 208(1). Session module 104 may receive notification 212 as a HTTP server push communication, via a long-polling connection established by a client agent, or by any other suitable mechanism.

At step 304, one or more of the systems described herein may derive, based on one or more authentication elements received from a user, the master key. For example, derivation module 106 may, as part of client 202 in FIG. 2, derive, based on one or more authentication elements 216 received from a user, master key 218. As will be described in greater detail below, derivation module 106 may obtain authentication elements from the user and derive the master key at the beginning of a single-sign-on session. Thereafter, systems described herein may manage encryption keys without additional interaction with the user.

Derivation module 106 may derive a master key in a variety of ways. For example, derivation module 106 may derive the master key by applying a hashing function to the authentication element received from the user. For example, derivation module 106 may use Password-Based Key Derivation Function 2 (PBKDF2) or any suitable key derivation function to convert a password or other authentication factor to a cryptographic key.

In some examples, derivation module 106 may retrieve the master key from a secure key store, rather than deriving the master key algorithmically. For example, as shown in FIG. 2, derivation module 106 may derive master key 218 by first authenticating the user based on one or more authentication elements 216 received from the user. After authenticating the user, derivation module 106 may retrieve a private key for encrypting and decrypting the master key, retrieve the encrypted master key from client key store 222, and use the private key to decrypt master key 218. As will be described in greater detail below, the private key may be stored on a personal device, such as a mobile phone. The encrypted master key may be stored in client key store 222, which may reside on client 202 or at identity service 210.

At step 306, one or more of the systems described herein may decrypt, using the master key, a cloud service key for decrypting data on the cloud service. For example, service module 108 may, as part of client 202 in FIG. 2, decrypt, using master key 218, cloud service key 220 for decrypting data on cloud service 208(1).

Service module 108 may decrypt the cloud service key in a variety of ways. For example, service module 108 may retrieve the encrypted cloud service key from cloud service 208(1) and, using master key 218, decrypt the encrypted key to produce cloud service key 220. In some examples, client key store 222 may reside at identity service 210. Service module 108 may retrieve the encrypted cloud service key from identity service 210 and encrypt the cloud service key using master key 218 to produce cloud service key 220. In some examples, service module 108 may receive the encrypted cloud service key by receiving the cloud service key with the session key and/or receiving the cloud service key in response to a request to identity service 210 to provide the encrypted cloud service key.

After decrypting cloud service key 220, service module 108 may use cloud service key 220 to decrypt encrypted data stored by cloud service 208(1). In some examples, service module 108 may provide decrypted cloud service key 220 to cloud service 208(1) for decrypting the encrypted data. After decrypting the data, cloud service 208(1) may transmit the decrypted data to client 202. Cloud service 208(1) may then discard cloud service key 220, so that cloud service key 220 does not remain on cloud service 208(1) with the encrypted data. In some examples, service module 108 may receive encrypted data from cloud service 208(1) and decrypt the data using cloud service key 220. In this example, cloud service 208(1) does not, even temporarily, obtain cloud service key 220 needed to decrypt data stored on cloud service 208(1).

At step 308, one or more of the systems described herein may store the master key in a client key store, encrypted using the session key. For example, encryption module 110 may, as part of client 202 in FIG. 2, store master key 218 in client key store 222, encrypted using session key 214.

Encryption module 110 may store the encrypted master key in a variety of ways. For example, encryption module 110 may encrypt master key 218 using session key 214 and store the encrypted master key in client key store 222, which may reside on client 202. Alternatively encryption module 110 may store the encrypted master key in client key store 222, residing on identity service 210. As will be described in greater detail below, locating client key store 222 on identity service 210 may facilitate cloud service single-sign-on from multiple clients.

At step 310, one or more of the systems described herein may receive, from the identity service, an additional notification of an additional request to access encrypted data on an additional cloud service, the notification including the session key. For example, session module 104 may, as part of client 202 in FIG. 2, receive, from identity service 210, additional notification 226 of an additional request to access encrypted data on cloud service 208(2), with notification 212 including session key 214.

Session module 104 may receive an additional request to access encrypted data on a cloud service in a variety of ways. For example, session module 104 may receive from identity service 210 additional notification 226 that includes session key 214. In another example, client key store 222 may be located on identity service 210. In this example, session module 104 may receive additional notification 226 that includes session key 214 and additional cloud service key 230, which was encrypted with master key 218.

At step 312, one or more of the systems described herein may, without again obtaining the authentication element from the user, decrypt the master key by using the session key. For example, decryption module 112 may, as part of client 202 in FIG. 2, without again obtaining authentication element 216 from the user, decrypt master key 218 by using session key 214.

Decryption module 112 may decrypt master key 218 in a variety of ways. For example, decryption module 112 may retrieve encrypted master key 224, which was encrypted using session key 214, from client key store 222. Decryption module 112 may decrypt encrypted master key 224 using session key 214 to produce decrypted master key 228. In another example, and as will be described in greater detail below, decryption module 112 may retrieve encrypted master key 224 from a personal device, such as a mobile phone.

At step 314, one or more of the systems described herein may decrypt, using the master key, an additional cloud service key for decrypting data on the additional cloud service. For example, service module 108 may, as part of client 202 in FIG. 2, decrypt, using decrypted master key 228, additional cloud service key 230 for decrypting data on additional cloud service 208(2).

Service module 108 may decrypt additional cloud service key 230 in a variety of ways. For example, service module 108 may retrieve additional cloud service key 230, which was encrypted using master key 218, from cloud service 208(2). Service module may decrypt additional cloud service key 230 using decrypted master key 228. In another example, service module 108 may retrieve additional cloud service key 230 from identity service 210.

FIG. 4 is a block diagram of an additional exemplary system 400 for managing encryption keys for single-sign-on applications. Exemplary system 400 illustrates how systems described herein may manage encryption keys to facilitate single-sign-on from multiple client devices. Exemplary system 400 includes several components of exemplary system 200 in FIG. 2, such as client 202, network 204, cloud services 206, and identity service 210. Client key store 222 may be located on identity service 210. Exemplary system 400 also includes personal device 402, which includes private key store 404. Exemplary system 400 also includes additional client 408, which, like client 202, includes modules 102 as shown in FIG. 1.

In one example, a user may attempt to access encrypted data on cloud service 208(1) from client 202. Cloud service 208(1) may request that identity service 210 verify the user's identity before allowing client 202 to access data on cloud service 208(1). Identity service 210 may transmit to modules 102 on client 202 notification 212, which may include session key 214, encrypted master key 224, which was encrypted using a private key 406 stored in private key store 404 on personal device 402, and encrypted cloud service key 410, which was encrypted using master key 218. In response to receiving notification 212, modules 102 on client 202 may authenticate the user. Alternatively, modules 102 on client 202 may direct the user to enter a password or provide other authentication elements for authentication on personal device 402.

After the user has been authenticated, modules 102 on client 202 may transmit session key 214 to personal device 402. Personal device 402 may encrypt private key 406 using session key 215 to produce encrypted private key 414, then transmit encrypted private key 414 to client 202. Modules 102 on client 202 may decrypt private key 406 using session key 214, and then use private key 406 to decrypt encrypted master key 224 to produce master key 218. Modules 102 may then re-encrypt master key 218 using session key 214 and transmit the encrypted master key to personal device 402, for storage in private key store 404. Modules 102 may then decrypt cloud service key 220 using master key 218. Client 202 may then provide the decrypted cloud service key 220 to cloud service 208(1) to decrypt encrypted data stored on cloud service 208(1). Alternatively, client 202 may retrieve encrypted data from cloud service 208(1) and decrypt the encrypted data on client 202 using cloud service key 220.

After accessing data on cloud service 208(1) from client 202, the user may attempt to access encrypted data on cloud service 208(2) from additional client 408. Cloud service 208(2) may request that identity service 210 verify the user's identity before allowing additional client 408 to access data on cloud service 208(2). Identity service 210 may transmit additional notification 226 to modules 102 on additional client 408. As with notification 212, additional notification 226 may include session key 214. Additional notification 226 may also include encrypted additional cloud service key 412, which was encrypted using master key 218.

Because the user's identity has already been verified, instead of providing a password or other authentication elements, the user may be directed to verify on personal device 402 that the user has attempted to access encrypted data on cloud service 208(2), and that access should be permitted using the single-sign-on session already established. After the user has verified that access to the encrypted data should be permitted, personal device 402 may transmit to additional client 408 master key 218 that was previously encrypted using session key 214 and stored in private key store 406. Modules 102 on additional client 408 may decrypt master key 218 using session key 214 received from identity service 210. Modules 102 on additional client 408 may then decrypt encrypted additional cloud service key 412 using master key 218 to produce additional cloud service key 230. Modules 102 on additional client 408 may then use additional cloud service key 230 to decrypt encrypted data on cloud service 208(2), either by providing additional cloud service key 230 to cloud service 208(2) or by retrieving encrypted data from cloud service 208(2) and decrypting the data on additional client 408.

As described in greater detail above, the systems and methods described herein may manage encryption keys to facilitate single-sign-on to multiple cloud applications while maintaining the security of encrypted data stored with the applications. The systems and methods described herein may provide user access to encrypted data stores without the need for encryption keys to be stored with the encrypted data. In some embodiments, cloud services never access, even temporarily, the keys needed to decrypt user data stored at the services.

Figure 5:
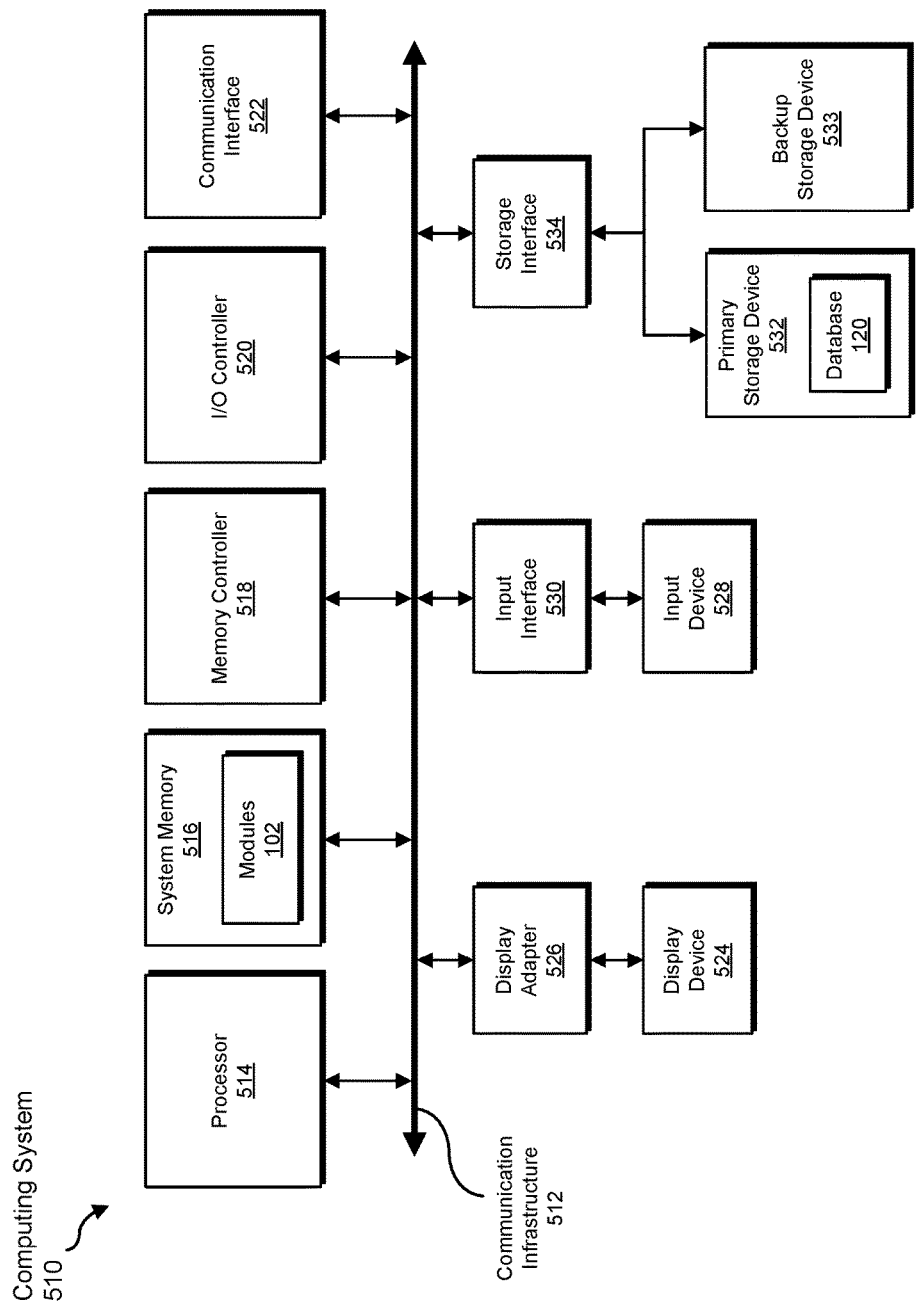
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
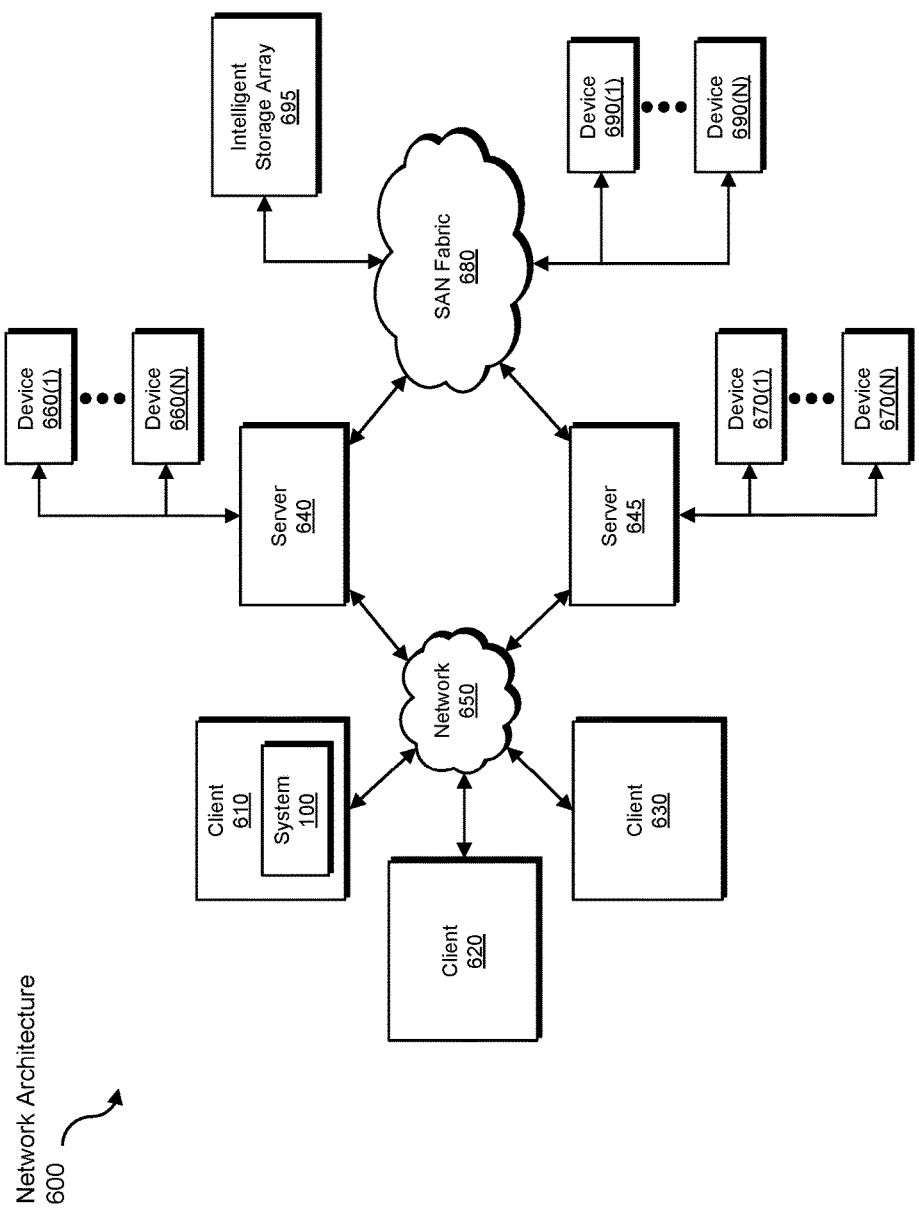
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for managing encryption keys for single-sign-on applications.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive authentication elements to be transformed, transform the authentication elements, output a result of the transformation to produce one or more cryptographic keys, use the result of the transformation to manage cryptographic keys, and store the result of the transformation to facilitate single-sign-on access to encrypted data maintained by one or more cloud services. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for managing encryption keys for single-sign-on applications, at least a portion of the method being performed by a client computing device comprising at least one processor, the method comprising:
    receiving, by the client computing device, from an identity service, a notification of a request to access encrypted data on a cloud service, the notification including a session key for encrypting and decrypting a master key for decrypting cloud service keys;
    deriving, by the client computing device, based on at least one authentication element received from a user, the master key, wherein the at least one authentication element comprises an authentication factor and wherein deriving the master key comprises:
        converting the authentication factor to a cryptographic key utilizing a hash-based key derivation function;
        authenticating the user based on the authentication element;
        in response to authenticating the user, retrieving a private key for encrypting and decrypting the master key; and
        using the private key to decrypt the master key;
    decrypting, by the client computing device, using the master key, a cloud service key for decrypting data on the cloud service;
    storing, by the client computing device, the master key, encrypted using the session key, in a client key store;
    receiving, by the client computing device, from the identity service, an additional notification of an additional request to access encrypted data on an additional cloud service, the notification including the session key;
    without again obtaining the authentication element from the user, decrypting, by the client computing device, the master key by using the session key;
    decrypting, by the client computing device, using the master key, an additional cloud service key for decrypting data on the additional cloud service; and
    performing, by the client computing device, a security action, wherein the security action allows access to the single-sign-on applications and protects the encrypted data from being accessed by the cloud services by storing the encrypted data on the cloud service without the session key.

2. The computer-implemented method of claim 1, further comprising providing the decrypted cloud service key to the cloud service for decrypting the encrypted data.

3. The computer-implemented method of claim 1, further comprising receiving the encrypted data from the cloud service for decryption using the decrypted cloud service key.

4. The computer-implemented method of claim 1, further comprising receiving the cloud service key from the cloud service.

5. The computer-implemented method of claim 1, further comprising receiving the cloud service key from the identity service.

6. The computer-implemented method of claim 5, wherein receiving the cloud service key comprises at least one of:
    receiving the cloud service key with the session key;
    receiving the cloud service key in response to a request to the identity service to provide the cloud service key.

7. The computer-implemented method of claim 1, further comprising:
    receiving, at the identity service, a request to facilitate access to encrypted data on the cloud service by providing to a client agent the session key for encrypting and decrypting the master key for decrypting cloud service keys;
    providing the session key to the client agent.

8. A system for managing encryption keys for single-sign-on applications, the system comprising:
    a memory configured to store system modules;
    a session module, stored in the memory, that receives, by a client computing device, from an identity service, a notification of a request to access encrypted data on a cloud service, the notification including a session key for encrypting and decrypting a master key for decrypting cloud service keys;
    a derivation module, stored in the memory, that derives, by the client computing device, based on at least one authentication element received from a user, the master key, wherein the at least one authentication element comprises an authentication factor and wherein the derivation module derives the master key by:
        converting the authentication factor to a cryptographic key utilizing a hash-based key derivation function;
        authenticating the user based on the authentication element;
        in response to authenticating the user, retrieving a private key for encrypting and decrypting the master key; and
        using the private key to decrypt the master key;
    a service module, stored in the memory, that decrypts, by the client computing device, using the master key, a cloud service key for decrypting data on the cloud service;
    an encryption module, stored in the memory, that stores, by the client computing device, the master key, encrypted using the session key, in a client key store;
    the session module receives, by the client computing device, from the identity service, an additional notification of an additional request to access encrypted data on an additional cloud service, the notification including the session key;
    a decryption module, stored in the memory, that, without again obtaining the authentication element from the user, decrypts, by the client computing device, the master key by using the session key;
    wherein the service module decrypts, by the client computing device, using the master key, an additional cloud service key for decrypting data on the additional cloud service and performs, by the client computing device, a security action, wherein the security action allows access to the single-sign-on applications and protects the encrypted data from being accessed by the cloud services by storing the encrypted data on the cloud service without the session key; and at least one physical processor configured to execute the session module, the derivation module, the service module, the encryption module, and the decryption module.

9. The system of claim 8, wherein the service module provides the decrypted cloud service key to the cloud service for decrypting the encrypted data.

10. The system of claim 8, wherein the service module receives the encrypted data from the cloud service for decryption using the decrypted cloud service key.

11. The system of claim 8, wherein the service module receives the cloud service key from the cloud service.

12. The system of claim 8, wherein the service module receives the cloud service key from the identity service.

13. The system of claim 12, wherein the service module receives the cloud service key by at least one of:
receiving the cloud service key with the session key;
receiving the cloud service key in response to a request to the identity service to provide the cloud service key.

14. The system of claim 8, wherein:
the identity service receives a request to facilitate access to encrypted data on the cloud service by providing to a client agent the session key for encrypting and decrypting the master key for decrypting cloud service keys;
the identity service provides the session key to the client agent.

15. A non-transitory computer-readable medium comprising one or more computer-readable instructions that, when executed by at least one processor of a client computing device, cause the client computing device to:
receive, by the client computing device, from an identity service, a notification of a request to access encrypted data on a cloud service, the notification including a session key for encrypting and decrypting a master key for decrypting cloud service keys;
derive, by the client computing device, based on at least one authentication element received from a user, the master key, wherein the at least one authentication element comprises an authentication factor and wherein the master key is derived by:
converting the authentication factor to a cryptographic key utilizing a hash-based key derivation function;
authenticating the user based on the authentication element;
in response to authenticating the user, retrieving a private key for encrypting and decrypting the master key; and
using the private key to decrypt the master key;
decrypt, by the client computing device, using the master key, a cloud service key for decrypting data on the cloud service;
store, by the client computing device, the master key, encrypted using the session key, in a client key store;
receive, by the client computing device, from the identity service, an additional notification of an additional request to access encrypted data on an additional cloud service, the notification including the session key;
without again obtaining the authentication element from the user, decrypt, by the client computing device, the master key by using the session key;
decrypt, by the client computing device, using the master key, an additional cloud service key for decrypting data on the additional cloud service; and
performs, by the client computing device, a security action, wherein the security action allows access to single-sign-on applications and protects the encrypted data from being accessed by the cloud services by storing the encrypted data on the cloud service without the session key.

16. The non-transitory computer-readable medium of claim 15, wherein the one or more computer-readable instructions further cause the client computing device to provide the decrypted cloud service key to the cloud service for decrypting the encrypted data.

17. The non-transitory computer-readable medium of claim 15, wherein the one or more computer-readable instructions further cause the client computing device to receive the encrypted data from the cloud service for decryption using the decrypted cloud service key.

18. The non-transitory computer-readable medium of claim 15, wherein the one or more computer-readable instructions further cause the client computing device to receive the cloud service key from the cloud service.

19. The non-transitory computer-readable medium of claim 15, wherein the one or more computer-readable instructions further cause the client computing device to receive the cloud service key from the identity service.

* * * * *